United States Patent
Robins et al.

(10) Patent No.: US 9,314,976 B2
(45) Date of Patent: Apr. 19, 2016

(54) SYSTEMS AND METHODS FOR COMPACTING A CHARGE OF COMPOSITE MATERIAL

(71) Applicant: The Boeing Company, Seal Beach, CA (US)

(72) Inventors: Brian Gregory Robins, Renton, WA (US); Daniel M. Rotter, Lake Forest Park, WA (US); Kieran P. Davis, Cornwall, NY (US); Mark E. King, Maple Valley, WA (US)

(73) Assignee: The Boeing Company, Chicago, IL (US)

( * ) Notice: Subject to any disclaimer, the term of this patent is extended or adjusted under 35 U.S.C. 154(b) by 374 days.

(21) Appl. No.: 13/769,022

(22) Filed: Feb. 15, 2013

(65) Prior Publication Data

US 2014/0367039 A1 Dec. 18, 2014

(51) Int. Cl.

| | |
|---|---|
| *B29C 65/00* | (2006.01) |
| *B32B 37/00* | (2006.01) |
| *B29C 70/44* | (2006.01) |
| *B29C 43/36* | (2006.01) |
| *B29C 43/10* | (2006.01) |

(52) U.S. Cl.
CPC ............... *B29C 70/44* (2013.01); *B29C 43/36* (2013.01); *B29C 43/10* (2013.01); *B29C 2043/3605* (2013.01)

(58) Field of Classification Search
CPC B29C 65/00; B29C 66/00145; B29C 66/004; B29C 66/0042; B29C 66/005; B29C 66/0002; B32B 37/00; B32B 37/10; B32B 37/1018
See application file for complete search history.

(56) References Cited

U.S. PATENT DOCUMENTS

| | | | |
|---|---|---|---|
| 2,441,097 | A | 5/1948 | Hicks |
| 2,679,278 | A | 5/1954 | Clark |
| 4,280,804 | A | 7/1981 | Holland |
| 7,228,611 | B2 | 6/2007 | Anderson et al. |
| 7,527,222 | B2 | 5/2009 | Biordstad et al. |

(Continued)

OTHER PUBLICATIONS

Extended European search report for related European Application No. 14193766, May 22, 2015.

(Continued)

*Primary Examiner* — Michael N Orlando
*Assistant Examiner* — Matthew Hoover
(74) *Attorney, Agent, or Firm* — Dascenzo Intellectual Property Law, P.C.

(57) ABSTRACT

Systems and methods for compacting a charge of composite material. These systems and methods may utilize a vacuum compaction device to compact the charge of composite material on a supporting surface. The vacuum compaction device may be reusable and may be configured to define an enclosed volume when positioned on the supporting surface and may include a barrier structure and a sealing structure that is configured to form a fluid seal when compressed between the supporting surface and the barrier structure. The vacuum compaction device also may include a vacuum distribution manifold that is in fluid communication with and configured to selectively apply a vacuum to the enclosed volume. Application of the vacuum to the enclosed volume may decrease a pressure within the enclosed volume and transition the vacuum compaction device from an undeformed configuration to a deformed configuration, thereby compacting the charge of composite material on the supporting surface.

19 Claims, 7 Drawing Sheets

(56) References Cited

U.S. PATENT DOCUMENTS

| | | |
|---|---|---|
| 7,624,488 B2 | 12/2009 | Lum et al. |
| 7,879,177 B2 | 2/2011 | McCowen et al. |
| 8,157,212 B2 | 4/2012 | Biordstad et al. |
| 8,168,023 B2 | 5/2012 | Chapman et al. |
| 8,182,628 B2 | 5/2012 | Biordstad et al. |
| 2010/0011580 A1 | 1/2010 | Brennan et al. |
| 2010/0012260 A1 | 1/2010 | Brennan et al. |
| 2010/0078126 A1* | 4/2010 | Brennan et al. ............... 156/286 |
| 2013/0042978 A1 | 2/2013 | Brennan et al. |

OTHER PUBLICATIONS

U.S. Appl. No. 13/626,452, filed Sep. 25, 2012, Robins et al.
U.S. Appl. No. 13/732,961, filed Jan. 2, 2013, Rotter et al.

* cited by examiner

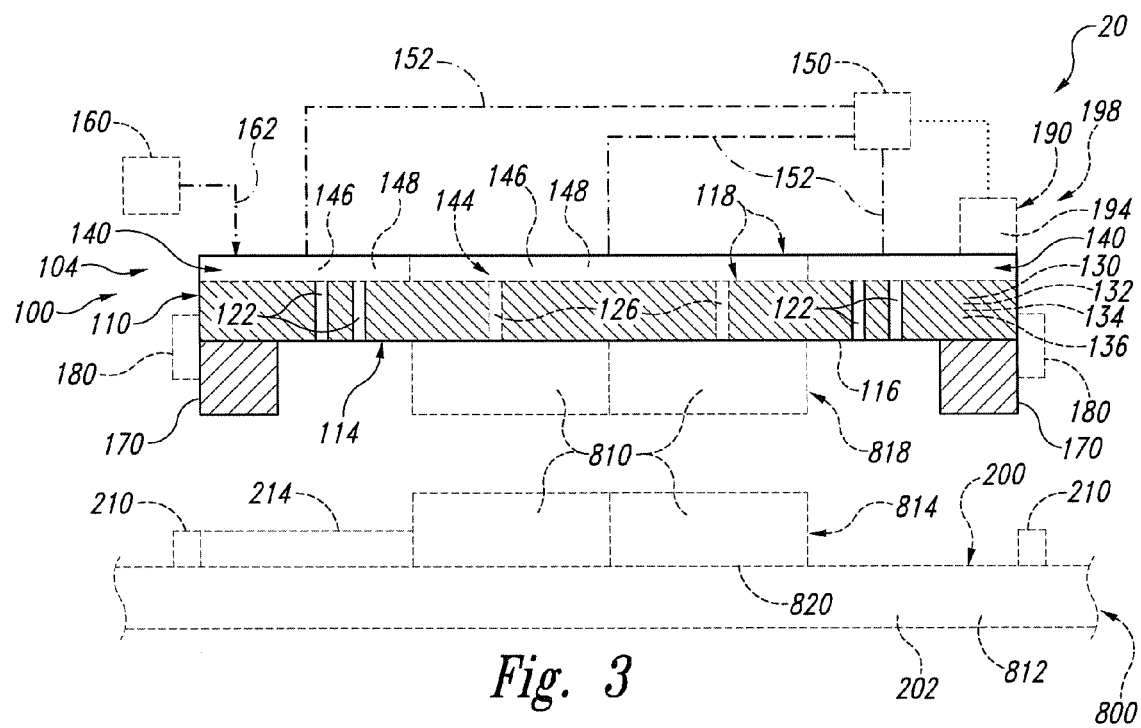
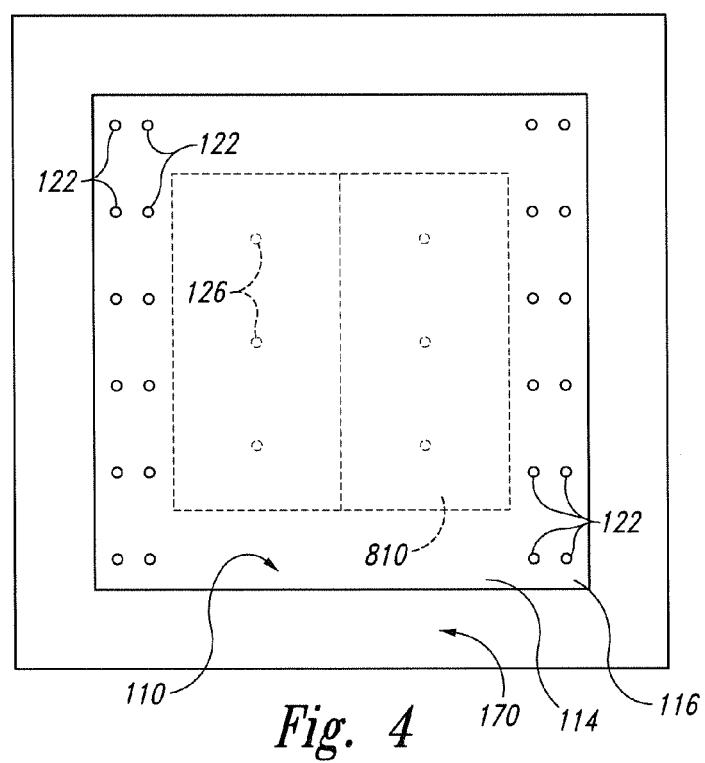

us 9,314,976 B2

SYSTEMS AND METHODS FOR COMPACTING A CHARGE OF COMPOSITE MATERIAL

FIELD

The present disclosure is directed generally to systems and methods for compacting a charge of composite material and more particularly to systems and methods that utilize a reusable vacuum compaction device to compact the charge of composite material.

BACKGROUND

Assembly of a composite structure may involve locating a charge of composite material on a layup mandrel and subsequently compacting the charge of composite material on the layup mandrel to form an intermediate structure that includes a compacted charge of composite material and the layup mandrel. The compacting may decrease a thickness of the charge of the composite material, remove void space from within the charge of composite material, increase adhesion among a plurality of layers, or plies, that may be present within the charge of composite material, increase adhesion between the charge of composite material and the layup mandrel, increase adhesion between the charge of composite material and materials that already may be present on the layup mandrel, and/or otherwise prepare the intermediate structure for further processing.

Historically, the compacting has been accomplished by a "bagging" process, wherein the charge of composite material and a portion of the layup mandrel are covered with a thin, flexible, polymeric sheet. The polymeric sheet is then taped to the layup mandrel to isolate (or at least substantially isolate) an enclosed volume from fluid communication with the ambient environment. Subsequently, a vacuum is applied to the enclosed volume to decrease a pressure therein, and atmospheric pressure acts upon the charge of composite material, thereby compacting the charge of composite material.

While the above-described procedure may be effective at compacting the charge of composite material, it is a time-consuming, labor-intensive, and material-intensive process that requires custom-fitting the polymeric sheet and manually taping the polymeric sheet to the layup mandrel. In addition, compaction of the charge of composite material onto a surface of the layup mandrel (such as an interior surface thereof) may require oversized polymer sheets that may extend to, past, and/or around a perimeter, or outer perimeter, of the layup mandrel and/or may require correspondingly long lengths of tape so as to prevent contamination of existing materials that may be present on the surface of the layup mandrel. Thus, there exists a need for improved systems and methods for compacting charges of composite material.

SUMMARY

Systems and methods for compacting a charge of composite material. These systems and methods may utilize a vacuum compaction device to compact the charge of composite material on a supporting surface. The vacuum compaction device may be reusable and may be configured to define an enclosed volume when positioned on the supporting surface and may include a barrier structure and a sealing structure that is configured to form a fluid seal when compressed between the supporting surface and the barrier structure. The vacuum compaction device also may include a vacuum distribution manifold that is in fluid communication with and configured to selectively apply a vacuum to the enclosed volume. Application of the vacuum to the enclosed volume may decrease a pressure within the enclosed volume and transition the vacuum compaction device from an undeformed configuration to a deformed configuration, thereby compacting the charge of composite material on the supporting surface.

In some embodiments, the barrier structure may be at least substantially planar when the vacuum compaction device is in the undeformed configuration and may at least partially conform to a contour of the supporting surface when the vacuum compaction device is in the deformed configuration. In some embodiments, the barrier structure may define a plurality of evacuation conduits that provide fluid communication between the vacuum distribution manifold and the enclosed volume. In some embodiments, the barrier structure also may define a plurality of retention conduits that are configured to retain the charge of composite material on a first side of the barrier structure prior to the charge of composite material being compacted on the supporting surface. In some embodiments, the barrier structure may include and/or be a double-walled panel that defines a plurality of elongate channels.

In some embodiments, the supporting surface includes a layup mandrel. In some embodiments, the supporting surface includes a previously compacted charge of composite material.

BRIEF DESCRIPTION OF THE DRAWINGS

FIG. 3 is a schematic cross-sectional view of illustrative, non-exclusive examples of a vacuum compaction device according to the present disclosure, wherein the vacuum compaction device is not positioned on a supporting surface.

FIG. 4 is a schematic bottom view of the vacuum compaction device of FIG. 3.

DESCRIPTION

Figure 1:
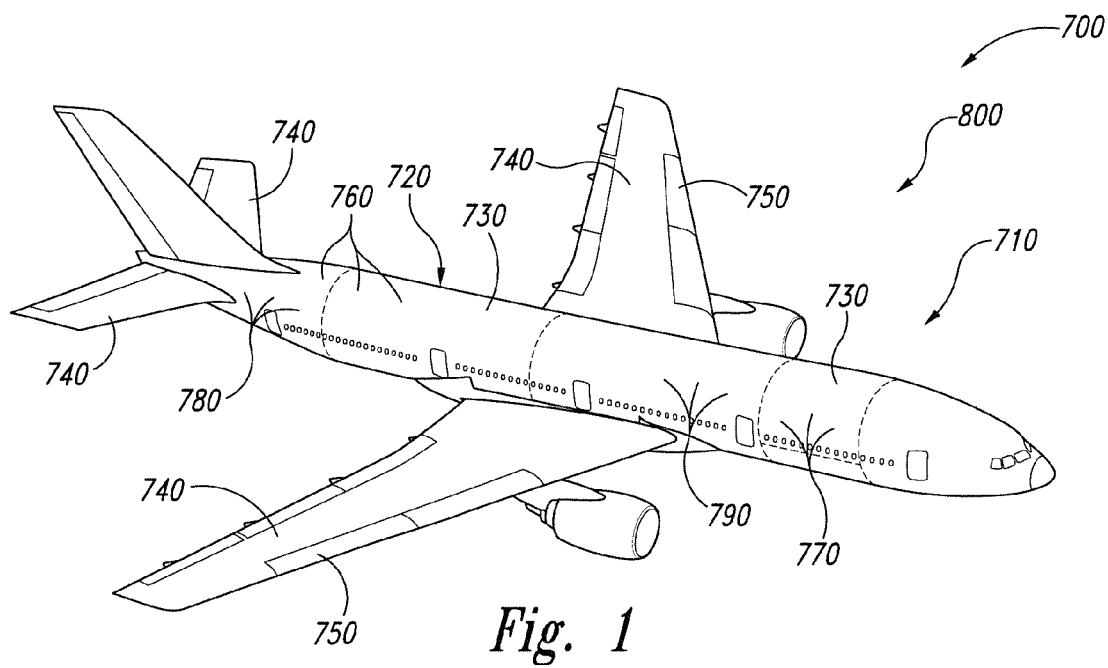
FIG. 1 is an illustrative, non-exclusive example of an aircraft that includes a composite structure that may be formed using the systems and methods according to the present disclosure.

FIGS. 1-11 provide illustrative, non-exclusive examples of composite structures 800, composite structure fabrication assemblies 20, and/or components thereof according to the present disclosure. Elements that serve a similar, or at least substantially similar, purpose are labeled with like numbers in each of FIGS. 1-11, and these elements may not be discussed in detail herein with reference to each of FIGS. 1-11. Similarly, all elements may not be labeled in each of FIGS. 1-11, but reference numerals associated therewith may still be utilized herein for consistency. In general, elements that are likely to be included in a given embodiment are shown in solid lines, while elements that are optional to a given embodiment are shown in dashed lines. However, elements that are shown in solid lines are not essential to all embodiments, and an element shown in solid lines may be omitted from a particular embodiment without departing from the scope of the present disclosure.

Figure 2:
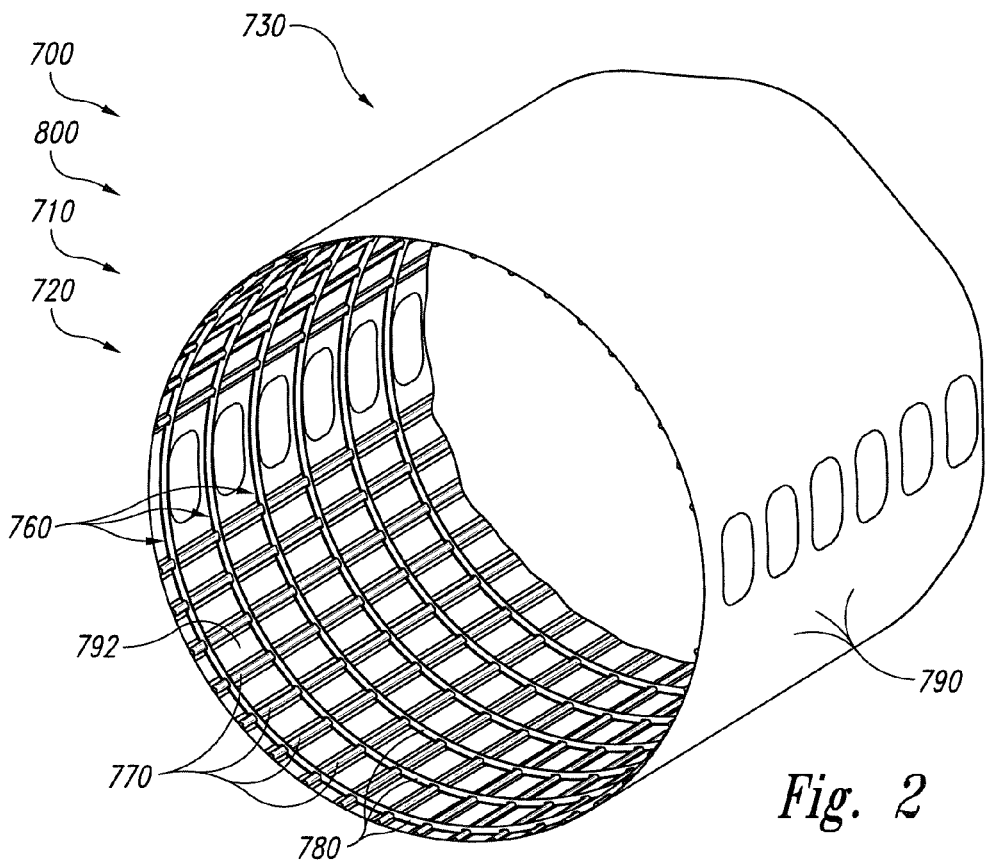
FIG. 2 is an illustrative, non-exclusive example of a fuselage barrel that includes a composite structure that may be formed using the systems and methods according to the present disclosure.

FIG. 1 is an illustrative, non-exclusive example of an aircraft 700 that includes a composite structure 800 that may be formed using the systems and methods according to the present disclosure, and FIG. 2 is an illustrative, non-exclusive example of a fuselage barrel 730 that may form a portion of aircraft 700 and includes composite structure 800. Aircraft 700 and/or composite structure 800 thereof may include a plurality of skin segments 790 that may form, cover, and/or be an outer surface of any suitable portion of aircraft 700. As illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800.

It is within the scope of the present disclosure that any suitable portion of aircraft 700 may be formed from and/or be composite structure 800. As illustrative, non-exclusive examples, composite structure 800 may form, or form a portion of, an airframe 710, a fuselage 720, a fuselage barrel 730, a wing 740, and/or a stabilizer 750 of aircraft 700.

FIGS. 3-7 provide schematic cross-sectional views of illustrative, non-exclusive examples of a vacuum compaction device 100 according to the present disclosure that may be utilized in and/or form a portion of composite structure fabrication assembly 20. Vacuum compaction device 100 of FIGS. 3-7 includes a barrier structure 110 that includes a first side 114 and an opposed second side 118. Vacuum compaction device 100 further includes a vacuum distribution manifold 140. Vacuum distribution manifold 140 is in fluid communication with first side 114 of barrier structure 110 through a plurality of evacuation conduits 122 that may be defined within barrier structure 110 and is configured to selectively apply a vacuum to the plurality of evacuation conduits 122.

The vacuum compaction device 100 also includes a sealing structure 170 that may be located between barrier structure 110 and a supporting surface 200, may be located on first side 114 of barrier structure 110, and/or may be operatively attached to first side 114 of barrier structure 110. Sealing structure 170 is configured to form a fluid seal between barrier structure 110 and supporting surface 200 when sealing structure 170 is compressed between barrier structure 110 and supporting surface 200.

Figure 5:
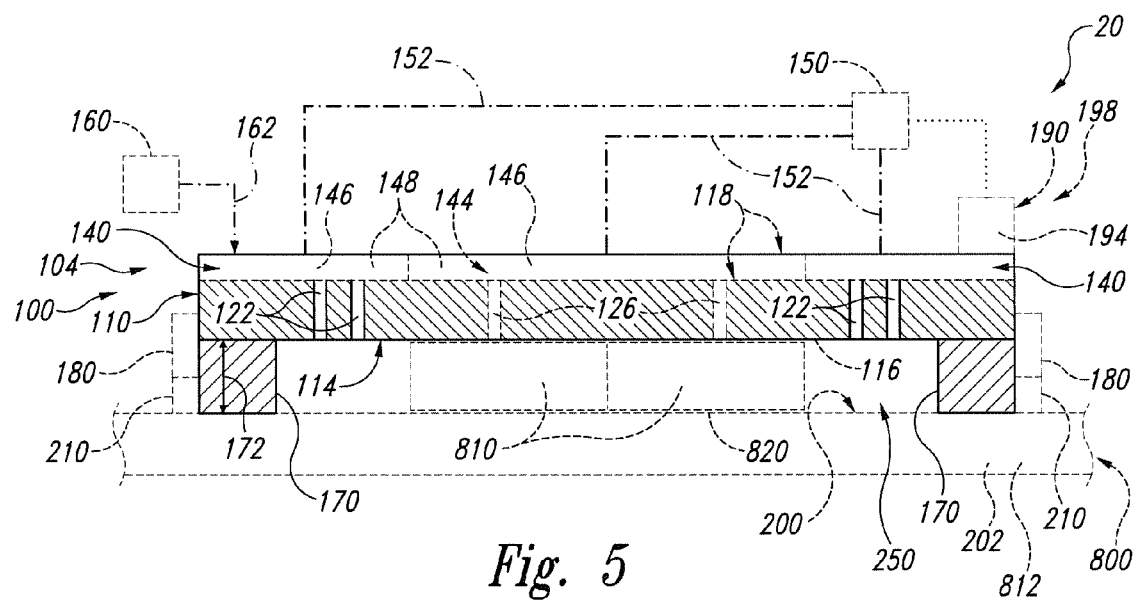
FIG. 5 is a schematic cross-sectional view of the vacuum compaction device of FIG. 3, wherein the vacuum compaction device is positioned on the supporting surface and in an undeformed configuration.
Figure 6:
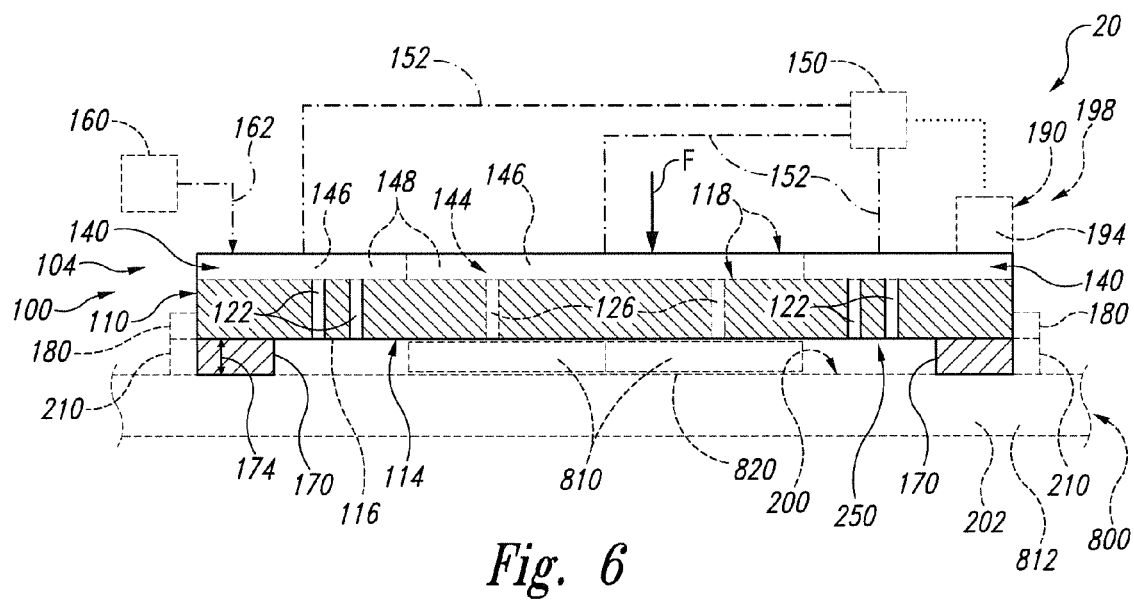
FIG. 6 is a schematic cross-sectional view of the vacuum compaction device of FIG. 3, wherein the vacuum compaction device is positioned on the supporting surface, is in a deformed configuration, and is compacting a charge of composite material.

As illustrated in FIGS. 5-6, vacuum compaction device 100 and supporting surface 200 together may define an enclosed volume 250 when vacuum compaction device 100 is positioned on supporting surface 200. Under these conditions, vacuum distribution manifold 140 is in fluid communication with enclosed volume 250 via evacuation conduits 122 and is configured to selectively apply the vacuum to enclosed volume 250 to decrease a pressure therein.

As illustrated in dashed lines in FIGS. 3-7, barrier structure 110 further may define a plurality of retention conduits 126 that provide fluid communication between a second vacuum distribution manifold 144, which also may be referred to herein as a retention manifold 144, and first side 114 of vacuum compaction device 100. In addition, composite structure fabrication assembly 20 further may include and/or be in fluid communication with a vacuum source 150 that is configured to generate a vacuum 152, as illustrated in dash-dot lines, that may be applied to evacuation conduits 122 by vacuum distribution manifold 140 and/or to generate vacuum 152 that may be applied to retention conduits 126 by second vacuum distribution manifold 144. When barrier structure 110 defines both evacuation conduits 122 and retention conduits 126, vacuum distribution manifold 140 also may be referred to herein as first vacuum distribution manifold 140 and/or evacuation manifold 140.

As also illustrated in dashed lines, vacuum compaction device 100 further may include one or more indexing structures 180 that are configured to align, index, and/or otherwise locate vacuum compaction device 100 relative to supporting surface 200 when vacuum compaction device 100 is positioned on supporting surface 200. Similarly, supporting surface 200 may include one or more complimentary indexing structures 210 that are configured to mate with, receive, and/or be received by indexing structures 180 when vacuum compaction device 100 is properly aligned on supporting surface 200.

Figure 12:
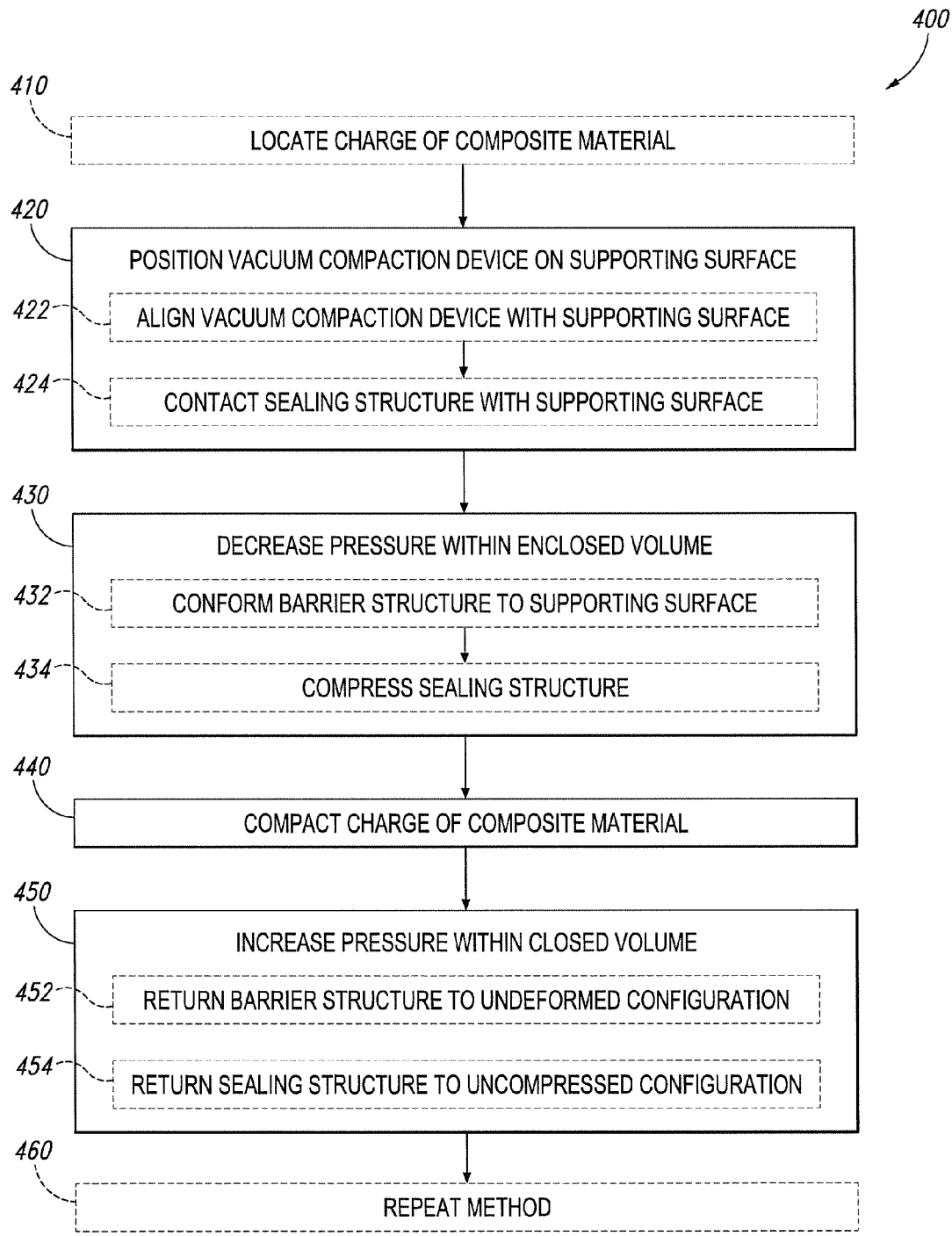
FIG. 12 is a flowchart depicting methods according to the present disclosure of compacting a charge of composite material.

As illustrated in FIG. 3 and discussed in more detail herein with reference to methods 400 of FIG. 12, a charge 810 of composite material may be located between vacuum compaction device 100 and supporting surface 200. This may include locating charge 810 on supporting surface 200, as indicated at 814, and/or locating charge 810 on first side 114 of barrier structure 110, as indicated at 818; and it is within the scope of the present disclosure that the locating may include locating any suitable number of charges 810 of composite material, such as 1, 2, 3, 4, 5, 10, or more than 10 charges of composite material, between vacuum compaction device 100 and supporting surface 200.

When charge 810 is placed on supporting surface 200, an alignment jig 214 may be utilized to accurately position charge 810 on supporting surface 200 and/or relative to any suitable structure and/or feature thereof, such as indexing structure 210. In addition, an adhesive 820 may be located between the supporting surface and charge 810 of composite material. This may include locating adhesive 820 on supporting surface 200 prior to placing charge 810 on supporting surface 200 and/or locating adhesive 820 on charge 810 prior to placing charge 810 on supporting surface 200.

When charge 810 is placed on first side 114 of barrier structure 110, the vacuum may be applied to retention conduits 126 to retain charge 810 on first side 114. As illustrated in FIG. 4, which is a schematic bottom view of vacuum compaction device 100 of FIG. 3, retention conduits 126 may be positioned such that charge 810 is positioned over and/or covering retention conduits 126. Thus, and when the vacuum is applied to retention conduits 126, this vacuum may decrease the pressure locally in a region between first side 114 and charge 810, thereby retaining charge 810 of composite material on first side 114 of barrier structure 110.

Subsequent to charge 810 being located between vacuum compaction device 100 and supporting surface 200, and as illustrated in FIG. 5, vacuum compaction device 100 may be positioned on supporting surface 200 to define enclosed volume 250. This may include aligning vacuum compaction device 100 with supporting surface 200, such as through the use of indexing structures 180 and 210.

It is within the scope of the present disclosure that the positioning may be accomplished in any suitable manner. As illustrative, non-exclusive examples, the positioning may include manually positioning vacuum compaction device 100 and/or automatically positioning vacuum compaction device 100. When vacuum compaction device 100 is automatically positioned on supporting surface 200, an automated positioning structure 190, such as an assembly robot 194, may be programmed to position vacuum compaction device 100 on supporting surface 200 and/or to locate charge 810 in the desired region of supporting surface 200. Automated positioning structure 190 may be programmed to compact any suitable number of charges 810 of composite material on supporting surface 200 using any of the methods 400 that are discussed in more detail herein.

After vacuum compaction device 100 is positioned on supporting surface 200, and as illustrated in FIG. 6, a pressure within enclosed volume 250 may be decreased. This may include selectively applying the vacuum from vacuum source 150 to enclosed volume 250, such as through vacuum distribution manifold 140 and/or evacuation conduits 122. Decreasing the pressure within enclosed volume 250 may create a pressure differential across vacuum compaction device 100, thereby generating an atmospheric pressure force, F, which may act on and/or be applied to vacuum compaction device 100.

Application of the atmospheric pressure force to vacuum compaction device 100 may transition vacuum compaction device 100 from an undeformed configuration 104, such as is illustrated in FIGS. 3-5 and 7, to a deformed configuration 108, such as is illustrated in FIGS. 6 and 8-10, thereby causing vacuum compaction device 100 and/or barrier structure 110 thereof to compress charge 810 between vacuum compaction device 100 and supporting surface 200 and generate a compacted charge 812 of composite material. This compression may serve as a motive force for compaction of charge 810 against and/or on supporting surface 200, such as to decrease a thickness of charge 810, to remove air from charge 810, to remove void space from charge 810, to increase interlayer adhesion among a plurality of composite plies that may comprise charge 810, and/or to increase adhesion between charge 810 and supporting surface 200.

Figure 7:
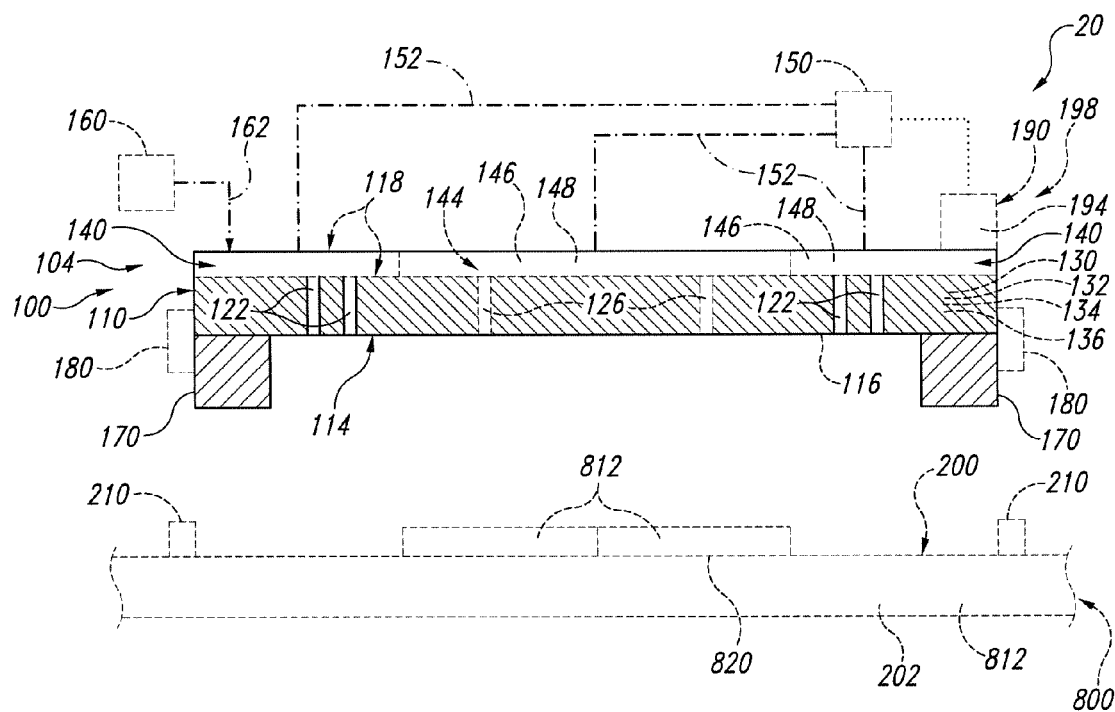
FIG. 7 is a schematic cross-sectional view of the vacuum compaction device of FIG. 3, wherein the vacuum compaction device has finished compacting the charge of composite material, has been returned to the undeformed configuration, and has been separated from the supporting surface.

Subsequent to compaction of charge 810 on supporting surface 200, the pressure within enclosed volume 250 may be increased. This may include ceasing the application of vacuum 152 to enclosed volume 250 from vacuum source 150 and/or selectively providing a bleed gas stream 162 (as illustrated in dash-dot lines) to enclosed volume 250, such as through a bleed valve 160. Increasing the pressure within enclosed volume 250 may decrease and/or eliminate atmospheric pressure force, F, and permit vacuum compaction device 100 to return to undeformed configuration 104, as illustrated in FIG. 7. Subsequently, and as also illustrated in FIG. 7, vacuum compaction device 100 may be separated from supporting surface 200. However, compacted charge 812 may remain on supporting surface 200.

This process may be repeated any suitable number of times to compact any suitable number of charges 810 of the composite material on supporting surface 200, thereby forming at least a portion of composite structure 800. In addition, automated positioning structure 190 also may include, be in communication with, and/or form a portion of a control system 198, which further may be programmed to control the operation of vacuum source 150, may control the operation of bleed valve 160, may control the application of vacuum from vacuum source 150 to vacuum distribution manifolds 140 and/or 144, and/or may control the flow of bleed stream 162. This may include controlling using any of the methods 400 that are discussed herein.

It is within the scope of the present disclosure that vacuum compaction device 100 may be a reusable vacuum compaction device 100. As such, the vacuum compaction device 100 may be adapted, configured, designed, selected, and/or constructed to be reused (or to be utilized a plurality of times) to compact a plurality of charges 810 of composite material on supporting surface 200. Additionally or alternatively, the vacuum compaction device 100 (any or any suitable component thereof) also may be adapted, configured, designed, selected, and/or constructed to transition between the undeformed configuration 104 and the deformed configuration 108 a plurality of times without damage to the vacuum compaction device 100 and/or to compact the plurality of charges 810 of composite material on the supporting surface 200 without damage to the vacuum compaction device 100.

After compaction of a target, or desired, number of charges 810 of composite material on supporting surface 200, a composite structure 800 that is formed from and/or includes the charges 810 of composite material may receive further processing prior to completion thereof. As an illustrative, non-exclusive example, composite structure 800 may be cured. As another illustrative, non-exclusive example, a layup mandrel 202, which may form at least a portion of supporting surface 200 and/or may support at least a portion of the plurality of charges 810 may be removed and/or separated from composite structure 800.

Returning more generally to FIGS. 3-7, barrier structure 110 may be configured to define evacuation conduits 122, retention conduits 126, first side 114, and/or second side 118. In addition, barrier structure 110 may function as and/or be an at least partial barrier to fluid flow between enclosed volume 250 and an ambient environment that surrounds vacuum compaction device 100.

Barrier structure 110 may include and/or define any suitable shape, conformation, profile, and/or contour. As illustrative, non-exclusive examples, and at least when in undeformed configuration 104, barrier structure 110 may define a planar, or at least substantially planar, conformation, shape, profile, and/or contour, such as may be defined by first side 114 and/or second side 118 thereof.

Figure 11:
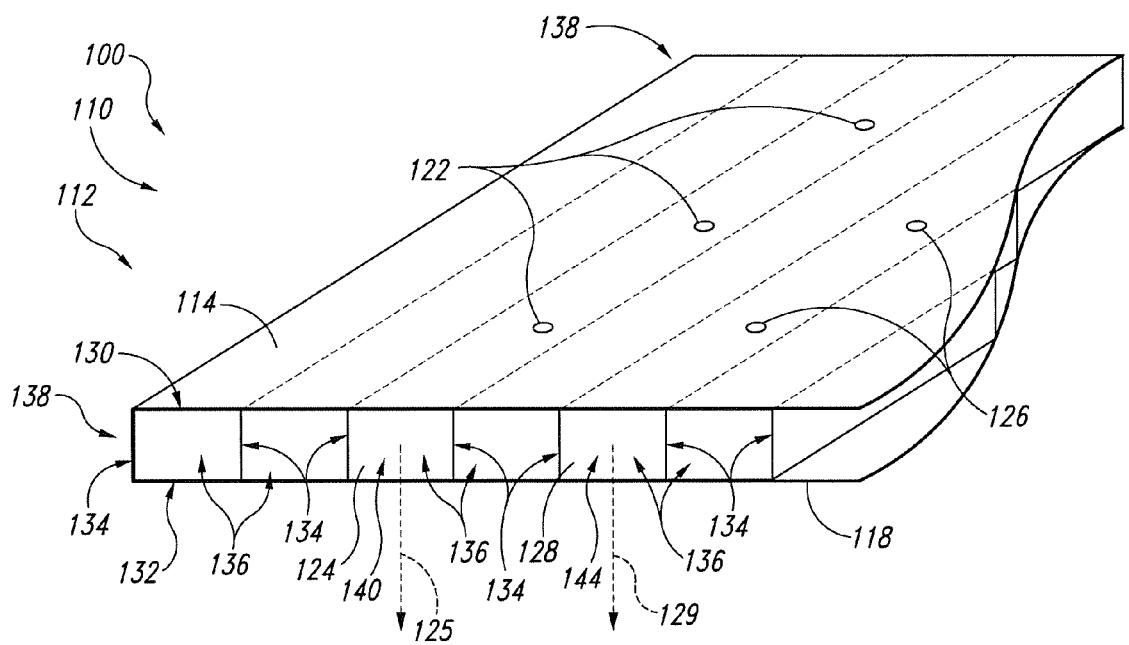
FIG. 11 is a schematic fragmentary view of illustrative, non-exclusive examples of a barrier structure that may be utilized with the systems and methods according to the present disclosure.

As an additional illustrative, non-exclusive example, and as discussed in more detail herein with reference to FIG. 11, barrier structure 110 may be defined by a first planar wall 130, a second planar wall 132, and a plurality of elongate webs 134 that extend between first planar wall 130 and second planar wall 132 to define a plurality of elongate channels 136. When barrier structure 110 defines elongate channels 136, at least a portion of the elongate channels may be in fluid communication with evacuation conduits 122 and/or retention conduits 126. Additionally or alternatively, the portion of elongate channels 136 may form a portion of vacuum distribution manifold 140 and/or second vacuum distribution manifold 144.

Additionally or alternatively, barrier structure 110 also may include and/or be formed from any suitable material. As illustrative, non-exclusive examples, barrier structure 110 may include and/or be formed from a flexible material and/or a resilient material. As additional illustrative, non-exclusive examples, barrier structure 110 may include and/or be formed from an optically transparent material, a semi-transparent material, and/or a translucent material, such as to permit visual inspection of charge 810 and/or supporting surface 200 when vacuum compaction device 100 is positioned on supporting surface 200. As additional illustrative, non-exclusive examples, barrier structure 110 also may be formed from and/or include a polymeric material and/or a polycarbonate material.

As illustrated in dashed lines in FIGS. 3-7, first side 114 of barrier structure 110 further may include and/or be defined by a release surface 116. Release surface 116 may be configured and/or selected to decrease, or decrease a potential for, adhesion between charge 810 and barrier structure 110, chemical reaction between charge 810 and barrier structure 110, and/or contamination of charge 810 by barrier structure 110. It is within the scope of the present disclosure that release surface 116 may be fabricated from any suitable material, including the same material as barrier structure 110 or a different material than barrier structure 110. Illustrative, non-exclusive examples of materials that may comprise release surface 116 include chemically inert materials, such as fluoropolymers.

Vacuum distribution manifold 140 and/or second vacuum distribution manifold 144, which also may be referred to herein as vacuum distribution manifolds 140 and 144, may include and/or be any suitable structure that is configured to selectively provide fluid communication between evacuation conduits 122 and/or retention conduits 126 and vacuum source 150. As illustrated in FIGS. 3 and 5-7 and discussed herein, it is within the scope of the present disclosure that at least a portion of vacuum distribution manifolds 140 and/or 144 may be defined by and/or within barrier structure 110. As an illustrative, non-exclusive example, elongate channels 136 may define a portion of vacuum distribution manifolds 140 and/or 144. However, it is also within the scope of the present disclosure that at least a portion of vacuum distribution manifolds 140 and/or 144 may be separate and/or distinct from barrier structure 110, as illustrated by the dashed line separating manifolds 140 and 144 from barrier structure 110.

Vacuum distribution manifolds 140 and/or 144 also may include any suitable additional structure. As an illustrative, non-exclusive example, at least one of vacuum distribution manifolds 140 and/or 144 may include a pressure detector 146 that is configured to detect a pressure within vacuum distribution manifolds 140 and/or 144 and/or within enclosed volume 250. As another illustrative, non-exclusive example, at least one of vacuum distribution manifolds 140 and/or 144 may include a vacuum control structure 148, such as a valve, that may be configured to selectively apply the vacuum from vacuum source 150 to vacuum distribution manifolds 140 and/or 144, evacuation conduits 122, retention conduits 126, and/or enclosed volume 250. When vacuum distribution manifolds 140 and/or 144 include vacuum control structure 148, it is within the scope of the present disclosure that vacuum control structure 148 may be actuated in any suitable manner. As an illustrative, non-exclusive example, vacuum control structure 148 may be manually actuated. As another illustrative, non-exclusive example, vacuum control structure 148 may be automatically actuated, such as via control system 198 and/or using methods 400 that are discussed herein.

Sealing structure 170 may include any suitable structure that may form the fluid seal between barrier structure 110 and supporting surface 200 when vacuum compaction device 100 is positioned on supporting surface 200. As illustrative, non-exclusive examples, sealing structure 170 may include and/or be a compression seal, a resilient seal, and/or a tubular resilient seal that may be formed from any suitable material, illustrative, non-exclusive examples of which include a resilient material, a polymeric material, latex, and/or urethane. This may include materials that do not adhere to, chemically react with, and/or transfer a contaminant to supporting surface 200.

Furthermore, sealing structure 170 may be located and/or configured in any suitable manner within vacuum compaction device 100 that may permit formation of the fluid seal. As an illustrative, non-exclusive example, sealing structure 170 may be located between barrier structure 110 and supporting surface 200. As another illustrative, non-exclusive example, sealing structure 170 may be located on and/or operatively attached to first side 114 of barrier structure 110.

It is within the scope of the present disclosure that sealing structure 170 may be configured to reversibly compress and/or deform when forming the fluid seal between barrier structure 110 and supporting surface 200. Thus sealing structure 170 may include and/or define an undeformed thickness 172 when vacuum compaction device 100 is in undeformed configuration 104 (as illustrated in FIG. 5) and a deformed thickness 174 when vacuum compaction device 100 is in deformed configuration 108 (as illustrated in FIG. 6). As further illustrated in FIGS. 5-6, deformed thickness 174 may be less than undeformed thickness 172. This deformation of sealing structure 170 when compressed between barrier structure 110 and supporting surface 200 (such as when the pressure within enclosed volume 250 is decreased) may improve, provide for, and/or permit formation of the fluid seal between barrier structure 110 and supporting surface 200.

As illustrated in FIGS. 5-6, enclosed volume 250 may be bounded and/or defined by supporting surface 200 and first side 114 of barrier structure 110. In addition, and as also illustrated, sealing structure 170 may bound, define, and/or form a periphery of enclosed volume 250. This may be accomplished by surrounding enclosed volume 250 by a continuous length of sealing structure 170, as illustrated in FIG. 4.

Supporting surface 200 may include any suitable surface that may receive charge 810 of composite material and/or may define at least a portion of enclosed volume 250. As an illustrative, non-exclusive example, supporting surface 200 may include a layup mandrel 202, such as an inner mold line layup mandrel and/or an outer mold line layup mandrel, that is configured to define a shape, contour, and/or profile of a composite structure 800 that may be formed from charge 810. Thus, sealing structure 170 may be configured to form the fluid seal between layup mandrel 202 and barrier structure 110.

As another illustrative, non-exclusive example, formation of composite structure 800 may include compacting a plurality of charges 810 of composite material on layup mandrel 202 to generate a plurality of compacted charges 812, which also may be referred to herein as previously compacted charges 812, of composite material prior to compaction of a given charge 810 of composite material. It is within the scope of the present disclosure that given charge 810 of composite material may be compacted at a location that is spaced apart from the plurality of previously compacted charges 812. Under these conditions, supporting surface 200 for the given charge 810 of composite material may be layup mandrels 202, the given charge may be compacted onto layup mandrel 202, and/or sealing structure 170 may form the fluid steal between layup mandrel 202 and barrier structure 110.

Additionally or alternatively, it is also within the scope of the present disclosure that given charge 810 of composite material may be compacted at a location that is proximal to, adjacent to, and/or includes at least one of the plurality of previously compacted charges 812. This may occur when given charge 810 is configured to be adjacent to, to abut, and/or to overlap with at least one of the plurality of previously compacted charges 812. Under these conditions, supporting surface 200 further may include and/or be the one or more previously compacted charges 812, at least a portion of given charge 810 may be compacted onto the one or more previously compacted charges 812, and/or sealing structure 170 may be configured to form the fluid seal between previously compacted charge 812 of composite material and barrier structure 110.

As discussed, charge 810 of composite material may be compacted on supporting surface 200 to form at least a portion of a composite structure 800. Illustrative, non-exclusive examples of composite structures 800 according to the present disclosure include any suitable aircraft 700, portion of an aircraft 700, airframe 710, fuselage 720, fuselage barrel 730, wing 740, or stabilizer 750. Illustrative, non-exclusive examples of charge 810 include any suitable filler 760, stringer 770, and/or skin segment 790 that may form a portion of composite structure 800.

Charge 810 of composite material also may be referred to herein as a mass 810 of composite material, a volume 810 of composite material, and/or a patch 810 of composite material, and may include any suitable structure. As an illustrative, non-exclusive example, charge 810 may include at least one ply of composite material. As another illustrative, non-exclusive example, charge 810 may include at least 2, at least 3, at least 4, at least 5, at least 10, at least 15, or at least 20 stacked plies of composite material. As yet another illustrative, non-exclusive example, charge 810 may include fewer than 80, fewer than 70, fewer than 60, fewer than 50, fewer than 45, fewer than 40, fewer than 35, fewer than 30, fewer than 25, fewer than 20, fewer than 15, or fewer than 10 stacked plies of composite material.

Charge 810 may be formed from and/or include any suitable composite material. As an illustrative, non-exclusive example, charge 810 may include a pre-impregnated composite material. As another illustrative, non-exclusive example, charge 810 may include a plurality of fibers and/or a resin material. Illustrative, non-exclusive examples of fibers include carbon fibers, polymeric fibers, metallic fibers, and/or glass fibers. Illustrative, non-exclusive examples of resin materials include epoxy, adhesive, and/or polymeric resin. As additional illustrative, non-exclusive examples, charge 810 may include a metallic ply, a metallic film, a metallic layer, and/or any suitable combination of the above materials.

As discussed, vacuum compaction device 100 defines at least undeformed configuration 104 and deformed configuration 108. As also discussed, sealing structure 170 may be transitioned from undeformed thickness 172 to deformed thickness 174 when vacuum compaction device 100 transitions from undeformed configuration 104 to deformed configuration 108. Additionally or alternatively, it is also within the scope of the present disclosure that a shape, profile, and/or contour of barrier structure 110 may change depending upon the configuration of vacuum compaction device 100. As an illustrative, non-exclusive example, and when vacuum compaction device 100 is in undeformed configuration 104, barrier structure 110 may include and/or define a planar, or at least substantially planar, shape, profile, and/or contour. As another illustrative, non-exclusive example, and when vacuum compaction device 100 is in deformed configuration 108, a shape, profile, and/or contour of barrier structure 110 (such as a shape, profile, and/or contour of first side 114 and/or second side 116 thereof) may conform, or at least partially conform, to a shape, profile, and/or contour of supporting surface 200. This is illustrated in FIGS. 8-10, which provide schematic cross-sectional views of vacuum compaction devices 100 according to the present disclosure compacting a charge 810 of composite material on non-planar supporting surfaces 200.

Figure 8:
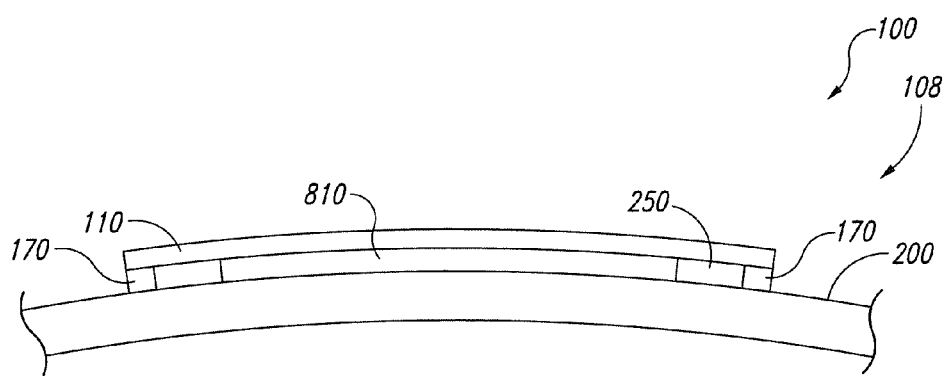
FIG. 8 is a schematic cross-sectional view of illustrative, non-exclusive examples of a vacuum compaction device according to the present disclosure compacting a charge of composite material on a convex surface.

As illustrated in FIG. 8, supporting surface 200 may include and/or be a convex supporting surface and/or may define a convex shape, profile, and/or contour. Under these conditions, and when vacuum compaction device 100 is positioned on supporting surface 200 and in deformed configuration 108, barrier structure 110 also may define the convex shape, profile, and/or contour.

Figure 9:
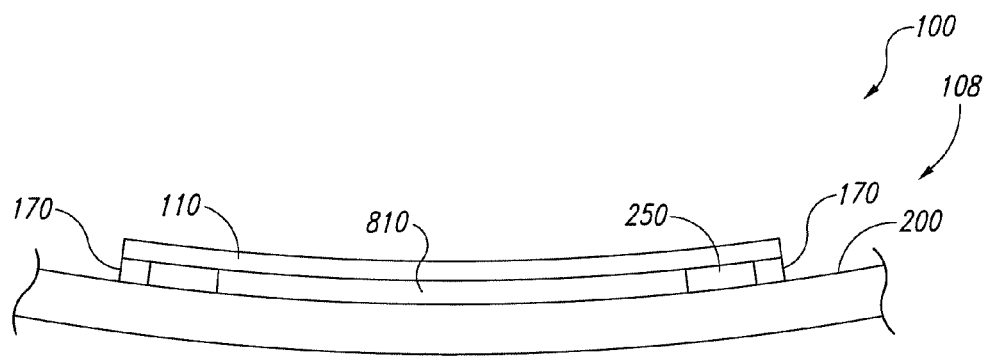
FIG. 9 is a schematic cross-sectional view of illustrative, non-exclusive examples of a vacuum compaction device according to the present disclosure compacting a charge of composite material on a concave surface.

Additionally or alternatively, and as illustrated in FIG. 9, supporting surface 200 may include and/or be a concave supporting surface and/or may define a concave shape, profile, and/or contour. Under these conditions, and when vacuum compaction device 100 is positioned on supporting surface 200 and in deformed configuration 108, barrier structure 110 also may define a convex shape, profile, and/or contour.

Figure 10:
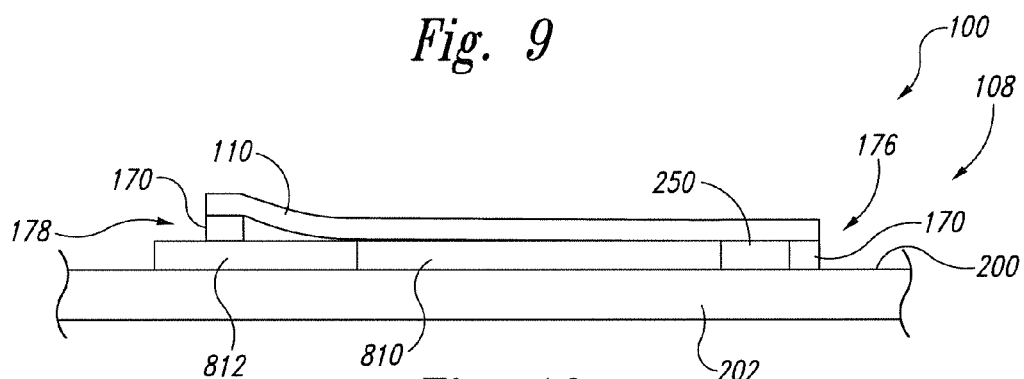
FIG. 10 is a schematic cross-sectional view of illustrative, non-exclusive examples of a vacuum compaction device according to the present disclosure sealing against a supporting surface that is at least partially defined by a previously compacted charge of composite material.

As illustrated in FIG. 10, supporting surface 200 also may include and/or define a discontinuous and/or stepped shape, profile, and/or contour. In FIG. 10, supporting surface 200 is defined by layup mandrel 202 and by previously compacted charge 812 of composite material. In addition, enclosed volume 250 has been evacuated and vacuum compaction device 100 is in deformed configuration 108. In FIG. 10, sealing structure 170 forms a portion of the fluid seal between layup mandrel 202 and barrier structure 110, as indicated at 176, and a portion of the fluid seal between previously compacted charge 812 and barrier structure 110, as indicated at 178. As illustrated, barrier structure 110 is deformed from a planar shape, profile, and/or contour due to application of the vacuum to enclosed volume 250. However, and as discussed, barrier structure 110 may return to the planar contour upon pressurization of enclosed volume 250 and/or removal of the vacuum therefrom.

FIG. 11 provides less schematic but still illustrative, non-exclusive examples of a barrier structure 110 according to the present disclosure. It is within the scope of the present disclosure that barrier structure 110 of FIG. 11 may be utilized with any of the vacuum compaction devices 100 that are disclosed herein and/or may form a portion of and/or be any of the barrier structures 110 that are disclosed herein with reference to any of FIGS. 3-12.

Barrier structure 110 of FIG. 11 includes a first planar wall 130, a second, opposed planar wall 132, and a plurality of elongate webs 134 that extend between first planar wall 130 and second planar wall 132. Such a barrier structure 110 also may be referred to herein as a panel 112 and/or a double-walled panel 112. Planar walls 130 and 132, together with the plurality of elongate webs 134, define a plurality of elongate channels 136 that extend within barrier structure 110. It is within the scope of the present disclosure that channels 136 may extend along a longitudinal axis that is parallel to first planar wall 130 and/or second planar wall 132, may extend from an edge 138 of barrier structure 110, may extend from a first edge of barrier structure 110 to a second edge of barrier structure 110, and/or may extend between two opposed edges of barrier structure 110.

First planar wall 130 may define first side 114 of barrier structure 110, and second planar wall 132 may define second side 118 of barrier structure 110. In addition, first planar wall 130 also may define at least a portion of evacuation conduits 122 and/or retention conduits 126, as shown. Evacuation conduits 122 may be in fluid communication with one or more selected elongate channels 136, which also may be referred to herein as evacuation channels 124 and may form a portion of vacuum distribution manifold 140. Thus, and as illustrated by a dashed arrow at 125 in FIG. 11, vacuum source 150 may selectively evacuate (or provide the vacuum to) evacuation channels 124. When barrier structure 110 of FIG. 11 forms a portion of vacuum compaction device 100 and is positioned on supporting surface 200, this vacuum may be utilized to decrease the pressure within enclosed volume 250, as discussed herein.

Similarly, retention conduits 126 may be in fluid communication with one or more selected elongate channels 136, which also may be referred to herein as retention channels 128 and may form a portion of second vacuum distribution manifold 144. Thus, and as illustrated by a dashed arrow at 129 in FIG. 11, vacuum source 150 may selectively evacuate (or provide the vacuum to) retention channels 128. When charge 810 of composite material is located on first surface 114 of barrier structure 110, this vacuum may be utilized to retain charge 810 of composite material on first surface 114 of barrier structure 110, as discussed herein.

FIG. 12 is a flowchart depicting methods 400 according to the present disclosure of compacting a charge of composite material on a supporting surface. In FIG. 12, some steps are illustrated in dashed boxes, indicating that such steps may be optional or may correspond to an optional version of a method according to the present disclosure. That said, not all methods according to the present disclosure are required to include the steps illustrated in solid boxes. In addition, the methods and steps illustrated in FIG. 12 are not limiting and other methods and steps are within the scope of the present disclosure, including methods having greater than or fewer than the illustrated number of steps, as understood from the discussions herein.

With this in mind, methods 400 may include locating a charge of composite material between a vacuum compaction device and a supporting surface at 410 and include positioning the vacuum compaction device on the supporting surface to define an enclosed volume at 420 and decreasing a pressure within the enclosed volume at 430. Methods 400 further include compacting the charge of composite material on the supporting surface at 440 and increasing the pressure within the enclosed volume at 450 and may include repeating the methods at 460.

Locating the charge of composite material between the vacuum compaction device and the supporting surface at 410 may include locating the charge of composite material prior to the positioning at 420. It is within the scope of the present disclosure that the locating at 410 may include locating a single charge of composite material or a plurality of charges of composite material. When the locating at 410 includes locating a plurality of charges of composite material, it is within the scope of the present disclosure that the positioning at 420 may include positioning the vacuum compaction device such that the enclosed volume contains the plurality of charges of composite material and the compacting at 440 may include simultaneously compacting the plurality of charges of composite material.

It is within the scope of the present disclosure that the locating at 410 also may include placing the charge of composite material on the supporting surface. This may include aligning the charge of composite material to the supporting surface, such as through the use of any suitable laser projection system and/or alignment jig. Additionally or alternatively the locating at 410 also may include forming the charge of composite material on the supporting surface. As an illustrative, non-exclusive example, the forming may include laying up a plurality of plies of composite material on the supporting surface to form the charge of composite material. The placing and/or the forming on the supporting surface also may include retaining the charge of composite material on the supporting surface subsequent to the placing and/or the forming, such as through the use of an adhesive.

It is also within the scope of the present disclosure that the locating at 410 also may include placing the charge of composite material on the vacuum compaction device. As an illustrative, non-exclusive example, the vacuum compaction device may include a barrier structure and the placing may include aligning the charge of composite material on the barrier structure. Additionally or alternatively, the locating at 410 also may include forming the charge of composite material on the vacuum compaction device. As an illustrative, non-exclusive example, the forming may include laying up a plurality of plies of composite material on the barrier structure to form the charge of composite material. The placing and/or the forming on the vacuum compaction device also may include retaining the charge of composite material on the vacuum compaction device subsequent to the placing and/or the forming. As an illustrative, non-exclusive example, the retaining may include applying a vacuum to a plurality of retention conduits that are defined by the barrier structure, as discussed herein.

Positioning the vacuum compaction device on the supporting surface to define the enclosed volume at 420 may include defining an enclosed volume that includes and/or contains the charge of composite material. It is within the scope of the present disclosure that the positioning at 420 also may include aligning the vacuum compaction device with the supporting surface at 422. This may include aligning, positioning, locating, and/or otherwise placing the vacuum compaction device such that the enclosed volume is defined by a desired portion of the supporting surface and/or such that the charge of composite material will be compacted on a desired location on the supporting surface. As an illustrative, non-exclusive example, the vacuum compaction device may include and/or define an indexing structure, and the supporting surface may include and/or define a complementary indexing structure. Under these conditions, the aligning at 422 may include aligning the indexing structure with the complementary indexing structure and/or receiving one of the indexing structure and the complementary indexing structure in the other of the indexing structure and the complementary indexing structure to accomplish the aligning.

Additionally or alternatively, the vacuum compaction device also may include a sealing structure that is configured to form a fluid seal between the vacuum compaction device, or the barrier structure thereof, and the supporting surface. Under these conditions, the positioning at 420 also may include contacting the sealing structure with the supporting surface at 424. As illustrative, non-exclusive examples, and as discussed, the supporting surface may include and/or be a layup mandrel and/or a previously compacted charge of composite material, and the contacting may include contacting the layup mandrel and/or the previously compacted charge of composite material with the sealing structure. Additionally or alternatively, the supporting surface may define a stepped profile that is defined by both the layup mandrel and the previously compacted charge of composite material, and the contacting at 424 may include contacting a first portion of the sealing structure with the layup mandrel and contacting a second portion of the sealing structure with the previously compacted charge of composite material.

Decreasing the pressure within the enclosed volume at 430 may include decreasing the pressure subsequent to the positioning at 420 and/or decreasing the pressure to transition the vacuum compaction device from an undeformed configuration to a deformed configuration that is different from the undeformed configuration. As an illustrative, non-exclusive example, the decreasing may include applying a vacuum, such as via any suitable vacuum distribution manifold and/or from any suitable vacuum source, to the enclosed vacuum to decrease the pressure within the enclosed volume and/or to at least partially evacuate the enclosed volume.

It is within the scope of the present disclosure that the decreasing at 430 also may include at least partially conforming the barrier structure to a shape, contour, or profile of the supporting surface at 432. As an illustrative, non-exclusive example, and when the vacuum compaction device is in the undeformed configuration, the barrier structure may include and/or define a planar, or at least substantially planar, shape, contour, or profile. However, and when the vacuum compaction device is in the deformed configuration, such as may occur during the decreasing at 430, the barrier structure may be deformed to a nonplanar, concave, and/or convex contour that may be similar to, or at least partially dependent on, the contour of the supporting surface.

It is also within the scope of the present disclosure that the decreasing at 430 may include compressing the sealing structure at 434. As an illustrative, non-exclusive example, and as discussed, the sealing structure may be located between the barrier structure and the supporting surface and/or may be operatively attached to a first side the barrier structure that faces the supporting surface. Under these conditions, the compressing at 434 may include transitioning the sealing structure from an uncompressed configuration to a compressed configuration, wherein a thickness of the sealing structure in a direction that is perpendicular to the first side of the barrier structure may be greater when the sealing structure is in the uncompressed configuration than when the sealing structure is in the compressed configuration.

Compacting the charge of composite material on the supporting surface at 440 may include compacting and/or compressing the charge of composite material between the vacuum compaction device and the supporting surface to produce, generate, and/or form a compacted charge of composite material on the supporting surface. The compacting at 440 may be at least partially concurrent with the decreasing at 430.

It is within the scope of the present disclosure that the compacting at 440 may include compacting the charge of composite material without "bagging" the charge of composite material, with illustrative, non-exclusive examples of "bagging" being discussed herein. Additionally or alternatively, it is also within the scope of the present disclosure that the compacting at 440 may include compacting the charge of composite material without forming an adhesive bond between the vacuum compaction device and the supporting surface.

Increasing the pressure within the enclosed volume at 450 may include increasing the pressure to transition the vacuum compaction device from the deformed configuration to the undeformed configuration and/or to return the vacuum compaction device to the undeformed configuration. As an illustrative, non-exclusive example, the increasing at 450 may include removing and/or isolating the vacuum from the enclosed volume and/or supplying a bleed gas stream to the enclosed volume to increase the pressure thereof. As additional illustrative, non-exclusive examples, the increasing at 450 may include returning the barrier structure to the undeformed configuration at 452 and/or returning the sealing structure to the uncompressed configuration at 454. The returning at 450 may be subsequent to the decreasing at 430 and/or the compacting at 440.

Repeating the methods at 460 may include repeating any suitable portion of methods 400 based upon any suitable criteria. As an illustrative, non-exclusive example, the charge of composite material may include and/or be a first charge of composite material, and the repeating at 460 may include repeating at least the positioning at 420, the decreasing at 430, the compacting at 440, and the increasing at 450 to compact a subsequent charge of composite material, or a plurality of charges of composite material, on the supporting surface. This may include repeating the methods to form a completed, or at least partially completed, composite structure, illustrative, non-exclusive examples of which are discussed in more detail herein.

It is within the scope of the present disclosure that the repeating at 460 may include transitioning the vacuum compaction device from the undeformed configuration to the deformed configuration and subsequently returning the vacuum compaction device to the undeformed configuration a plurality of times (i.e., reusing the vacuum compaction device to compact the plurality of charges of composite material). Additionally or alternatively, it is also within the scope of the present disclosure that the repeating at 460 may include repeating without damage to the vacuum compaction device, without "bagging" a respective charge of composite material of the plurality of charges of composite material, and/or without adhering the vacuum compaction device to the supporting surface.

Figure 13:
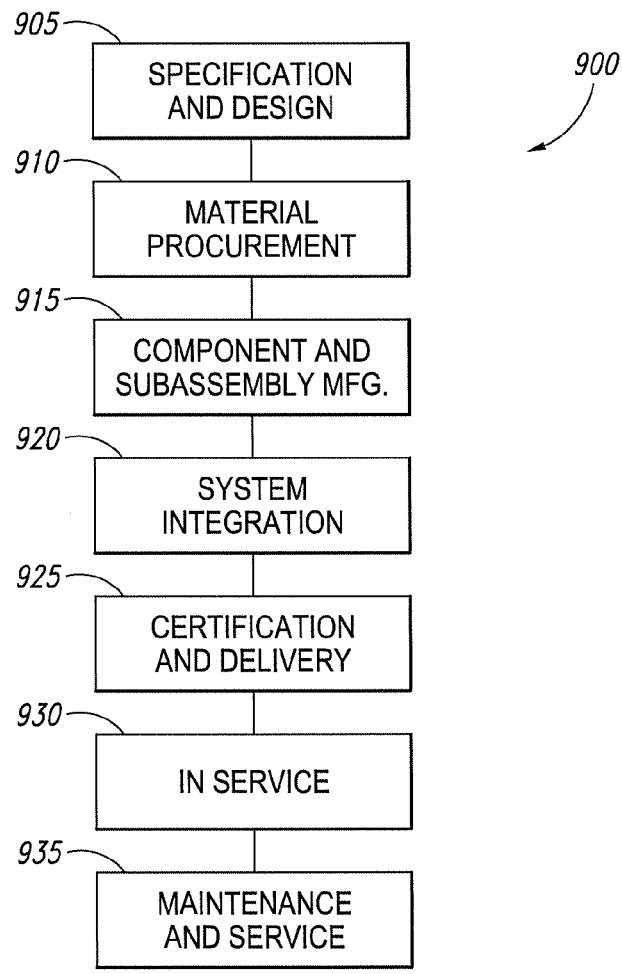
FIG. 13 is a flow diagram of aircraft production and service methodology.
Figure 14:
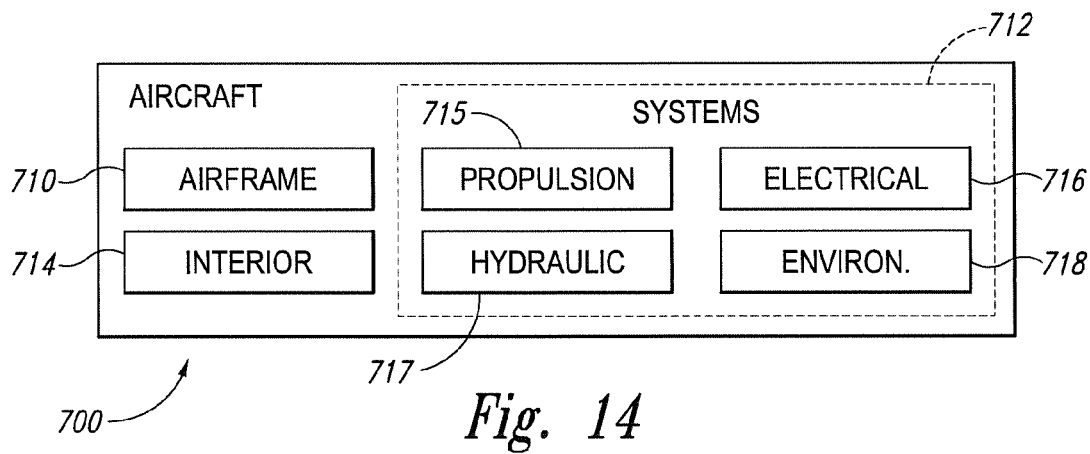
FIG. 14 is a block diagram of an aircraft.

Referring now to FIGS. 13-14, embodiments of the disclosure may be described in the context of an aircraft manufacturing and service method 900, as shown in FIG. 13, and an aircraft 700, as shown in FIG. 14. During pre-production, exemplary method 900 may include specification and design 905 of the aircraft 700 and material procurement 910. During production, component and subassembly manufacturing 915 and system integration 920 of the aircraft 700 takes place. Thereafter, the aircraft 700 may go through certification and delivery 925 in order to be placed in service 930. While in service by a customer, the aircraft 700 is scheduled for routine maintenance and service 935 (which also may include modification, reconfiguration, refurbishment, and so on).

Each of the processes of method 900 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 14, the aircraft 700 produced by exemplary method 900 may include an airframe 710 with a plurality of systems 712 and an interior 714. Examples of high-level systems 712 include one or more of a propulsion system 715, an electrical system 716, a hydraulic system 717, and an environmental system 718. Any number of other systems may be included. Although an aerospace example is shown, the principles of the invention may be applied to other industries, such as the automotive industry.

Apparatus and methods embodied herein may be employed during any one or more of the stages of the manufacturing and service method 900. For example, components or subassemblies corresponding to component and subassembly manufacturing process 915 may be fabricated or manufactured in a manner similar to components or subassemblies produced while the aircraft 700 is in service. Also, one or more apparatus embodiments, method embodiments, or a combination thereof may be utilized during the production stages 915 and 920, for example, by substantially expediting assembly of or reducing the cost of an aircraft 700. Similarly, one or more of apparatus embodiments, method embodiments, or a combination thereof may be utilized while the aircraft 700 is in service, for example and without limitation, to maintenance and service 935.

Illustrative, non-exclusive examples of inventive subject matter according to the present disclosure are described in the following enumerated paragraphs:

A1. A vacuum compaction device for compacting a charge of composite material on a supporting surface, wherein the device is configured to be positioned on the supporting surface to define an enclosed volume, the device comprising:

a barrier structure that includes a first side and an opposed second side;

a sealing structure that is configured to form a fluid seal between the supporting surface and the barrier structure when compressed therebetween; and a vacuum distribution manifold that is in fluid communication with and configured to selectively apply a vacuum to the enclosed volume.

A2. The device of paragraph A1, wherein the barrier structure is an at least substantially planar, and optionally planar, barrier structure.

A3. The device of any of paragraphs A1-A2, wherein the barrier structure is formed from a flexible material.

A4. The device of any of paragraphs A1-A3, wherein the barrier structure is formed from at least one of an optically transparent material, an optically semi-transparent material, and an optically translucent material.

A5. The device of any of paragraphs A1-A4, wherein the barrier structure is formed from at least one of a polymeric material and a polycarbonate.

A6. The device of any of paragraphs A1-A5, wherein the barrier structure further includes a release surface that defines the first side of the barrier structure, optionally wherein the release surface includes at least one of a material that is selected to not adhere to the charge of composite material, a material that is selected to not react with the charge of composite material, and a fluoropolymer.

A7. The device of any of paragraphs A1-A6, wherein the first side of the barrier structure further defines a plurality of retention conduits that are in fluid communication with the enclosed volume.

A8. The device of paragraph A7, wherein the vacuum distribution manifold is a first vacuum distribution manifold, wherein the vacuum is a first vacuum, and further wherein the device includes a second vacuum distribution manifold that is in fluid communication with and configured to selectively apply a second vacuum to the plurality of retention conduits.

A9. The device of paragraph A8, wherein the vacuum compaction device is configured to retain the charge of composite material on the first side when the charge of composite material is located on the first side and the second vacuum is applied to the plurality of retention conduits.

A10. The device of any of paragraphs A1-A9, wherein the barrier structure is defined by a first planar wall, a second planar wall, and a plurality of elongate webs that extend between the first planar wall and the second planar wall, optionally wherein the barrier structure is a panel, and further optionally wherein the barrier structure is a double-walled panel.

A11. The device of paragraph A10, wherein the first planar wall, the second planar wall, and the plurality of elongate webs defines a plurality of elongate channels that optionally extends from an edge of the barrier structure, and further optionally extends between a first edge of the barrier structure and a second edge of the barrier structure.

A12. The device of any of paragraphs A1-A10, wherein the barrier structure defines a plurality of elongate channels that optionally extends from an edge of the barrier structure, and further optionally extends between a first edge of the barrier structure and a second edge of the barrier structure.

A13. The device of any of paragraphs A11-A12, wherein the barrier structure defines a plurality of evacuation conduits that extends between one or more selected evacuation channels of the plurality of elongate channels and the first side of the barrier structure to provide fluid communication between the vacuum distribution manifold and the enclosed volume.

A14. The device of any of paragraphs A11-A13, wherein the barrier structure defines a/the plurality of retention conduits that extend between one or more selected retention channels of the plurality of elongate channels and the first side of the barrier structure to provide fluid communication between a/the second vacuum distribution manifold and the enclosed volume.

A15. The device of any of paragraphs A11-A14, wherein the plurality of elongate channels defines at least a portion of the vacuum distribution manifold.

A16. The device of any of paragraphs A1-A15, wherein the vacuum distribution manifold further includes a bleed valve that is configured to selectively supply a bleed gas stream to the enclosed volume.

A17. The device of any of paragraphs A1-A16, wherein the vacuum distribution manifold further includes a pressure detector that is configured to detect a pressure within the vacuum distribution manifold.

A18. The device of any of paragraphs A1-A17, wherein the vacuum distribution mechanism further includes a vacuum control structure that is configured to be selectively actuated to apply the vacuum to the enclosed volume, optionally wherein the vacuum control structure is configured to be at least one of manually actuated and automatically actuated.

A19. The device of any of paragraphs A1-A18, wherein the sealing structure defines a periphery of the enclosed volume.

A20. The device of any of paragraphs A1-A19, wherein the sealing structure is located between the barrier structure and the supporting surface when the vacuum compaction device is positioned on the supporting surface.

A21. The device of any of paragraphs A1-A20, wherein the sealing structure is operatively attached to the first side of the barrier structure.

A22. The device of any of paragraphs A1-A21, wherein the sealing structure is selected to at least one of not adhere to, not chemically react with, and not transfer a contaminant to the supporting surface.

A23. The device of any of paragraphs A1-A22, wherein the sealing structure includes at least one of a compression seal, a resilient seal, and a tubular resilient seal.

A24. The device of any of paragraphs A1-A23, wherein the sealing structure is formed from at least one of a resilient material, a polymeric material, latex, and urethane.

A25. The device of any of paragraphs A1-A24, wherein at least a portion of the enclosed volume is at least one of bounded by the supporting surface and defined by the supporting surface when the device is positioned on the supporting surface.

A26. The device of any of paragraphs A1-A25, wherein at least a portion of the enclosed volume is at least one of bounded by the first side of the barrier structure and defined by the first side of the barrier structure.

A27. The device of any of paragraphs A1-A26, wherein at least a portion, and optionally a periphery, of the enclosed volume is at least one of bounded by the sealing structure and defined by the sealing structure.

A28. The device of any of paragraphs A1-A27, wherein the supporting surface includes at least one, optionally at least two, optionally at least three, and further optionally all, of a layup mandrel, a previously compacted charge of composite material, a portion of a composite structure, and a portion of the composite structure that is supported by the layup mandrel.

A29. The device of any of paragraphs A1-A27, wherein the supporting surface includes a previously compacted charge of composite material, and further wherein the sealing structure is configured to form the fluid seal between the previously compacted charge of composite material and the barrier structure when compressed therebetween.

A30. The device of any of paragraphs A1-A29, wherein the device further includes a vacuum source that is configured to generate the vacuum, and optionally wherein the vacuum source is a high-flow vacuum source.

A31. The device of any of paragraphs A1-A30, wherein the device further includes an indexing structure that is configured to align the device on the supporting surface, and optionally wherein the supporting surface includes a complementary indexing structure that is configured to mate with the indexing structure when the device is aligned on the supporting surface.

A32. The device of any of paragraphs A1-A31, wherein the charge of composite material forms a portion of at least one of a composite structure, an airframe, a fuselage of an aircraft, a fuselage barrel of an aircraft, a wing of an aircraft, a stabilizer of an aircraft, a filler, a skin, and a stringer.

A33. The device of any of paragraphs A1-A32, wherein the charge of composite material includes at least one:

(i) at least 1 ply of composite material;
(ii) at least 2, at least 3, at least 4, at least 5, at least 10, at least 15, or at least 20 stacked plies of composite material; and
(iii) fewer than 80, fewer than 70, fewer than 60, fewer than 50, fewer than 45, fewer than 40, fewer than 35, fewer than 30, fewer than 25, fewer than 20, fewer than 15, or fewer than 10 stacked plies of composite material.

A34. The device of paragraph A33, wherein the composite material includes a plurality of fibers and a resin material, optionally wherein the plurality of fibers includes at least one of a plurality of carbon fibers, a plurality of polymeric fibers, and a plurality of glass fibers, and further optionally wherein the resin material includes at least one of an epoxy, an adhesive, and a polymeric resin.

A35. The device of any of paragraphs A33-A34, wherein the composite material includes a pre-impregnated composite material.

A36. The device of any of paragraphs A1-A35, wherein the device includes an undeformed configuration when not positioned on the supporting surface and the vacuum is not applied to the enclosed volume and a deformed configuration when positioned on the supporting surface and the vacuum is applied to the enclosed volume.

A37. The device of paragraph A36, wherein the barrier structure is planar when the device is in the undeformed configuration, and further wherein the barrier structure at least partially conforms to a contour of the supporting surface when the device is in the deformed configuration, optionally wherein the contour of the supporting surface includes at least one of a non-planar contour, a concave contour, and a convex contour.

A38. The device of any of paragraphs A36-A37, wherein the sealing structure defines a thickness that is measured in a direction that is perpendicular to the first side of the barrier structure, wherein the thickness includes an undeformed thickness when the device is in the undeformed configuration and a deformed thickness when the device is in the deformed configuration, and further wherein the deformed thickness is less than the undeformed thickness.

A39. The device of any of paragraphs A1-A38, wherein the vacuum compaction device is a reusable vacuum compaction device, optionally wherein the reusable vacuum compaction device is configured to compact a plurality of charges of composite material on the supporting surface, optionally without damage to the vacuum compaction device.

A40. A composite structure fabrication assembly comprising:

a plurality of charges of composite material;
a supporting surface; and
the vacuum compaction device of any of paragraphs A1-A39.

A41. The assembly of paragraph A40, wherein a layup mandrel forms at least a portion of the supporting surface, and optionally wherein the assembly includes an automated positioning structure that is programmed to locate each of the plurality of charges of composite material on the layup mandrel.

A42. The assembly of paragraph A41, wherein the automated positioning structure includes an assembly robot.

A43. The assembly of any of paragraphs A41-A42, wherein the automated positioning structure is programmed to locate each of the plurality of charges of composite material on the layup mandrel using the method of any of paragraphs B1-B23.

A44. The assembly of any of paragraphs A40-A43, wherein the vacuum compaction device is positioned on the supporting surface and defines the enclosed volume, wherein the charge of composite material is located within the enclosed volume, wherein the vacuum is applied to the enclosed volume, and further wherein a contour of the first side of the barrier structure corresponds to a contour of the supporting surface, and optionally wherein the contour of the supporting surface is at least one of a non-planar contour, a concave contour, and a convex contour.

A45. The assembly of paragraph A44, wherein the supporting surface is further defined by a previously compacted charge of composite material.

A46. The assembly of paragraph A45, wherein the supporting surface defines a stepped profile.

A47. The assembly of any of paragraphs A44-A46, wherein the assembly further includes an adhesive that is located between the charge of composite material and the supporting surface.

B1. A method of compacting a charge of composite material on a supporting surface, the method comprising:

positioning a vacuum compaction device on the supporting surface to define an enclosed volume that contains the charge of composite material;

decreasing a pressure within the enclosed volume to transition the vacuum compaction device from an undeformed configuration to a deformed configuration that is different from the undeformed configuration;

compacting the charge of composite material between the vacuum compaction device and the supporting surface; and increasing the pressure within the enclosed volume to return the vacuum compaction device to the undeformed configuration.

B2. The method of paragraph B1, wherein the vacuum compaction device includes a barrier structure that includes a first side and an opposed second side, wherein, subsequent to the positioning, the enclosed volume is defined between the first side of the barrier structure and the supporting surface.

B3. The method of paragraph B2, wherein the barrier structure is at least substantially planar when the vacuum compaction device is in the undeformed configuration, and further wherein the decreasing includes at least partially conforming the barrier structure to a contour of the supporting surface, optionally wherein the contour of the supporting surface includes at least one of a non-planar contour, a concave contour, and a convex contour, and further optionally wherein the conforming is at least partially concurrent with at least one of the decreasing and the compacting.

B4. The method of any of paragraphs B2-B3, wherein the vacuum compaction device further includes a sealing structure that is operatively attached to the first side of the barrier structure.

B5. The method of paragraph B4, wherein the decreasing includes compressing the sealing structure between the barrier structure and the supporting surface to transition the sealing structure from an uncompressed configuration to a compressed configuration that is different from the uncompressed configuration, and further wherein the increasing includes returning the sealing structure to the uncompressed configuration.

B6. The method of any of paragraphs B4-B5, wherein the positioning includes contacting the sealing structure with the supporting surface.

B7. The method of paragraph B6, wherein a portion of the supporting surface is defined by a layup mandrel, and further wherein the positioning includes contacting the sealing structure with the layup mandrel.

B8. The method of any of paragraphs B6-B7, wherein a portion of the supporting surface is defined by a previously compacted charge of composite material, and further wherein the positioning includes contacting the sealing surface with the previously compacted charge of composite material.

B9. The method of any of paragraphs B6-B8, wherein the supporting surface defines a stepped profile that is defined by a/the layup mandrel and a/the previously compacted charge of composite material, and further wherein the positioning includes contacting the sealing surface with the layup mandrel and the previously compacted charge of composite material.

B10. The method of paragraph B9, wherein the decreasing includes compressing a first portion of the sealing structure between the barrier structure and the mandrel and compressing a second portion of the sealing structure between the barrier structure and the previously compacted charge of composite material.

B11. The method of any of paragraphs B1-B10, wherein the method further includes locating the charge of composite material between the vacuum compaction device and the supporting surface prior to the positioning.

B12. The method of paragraph B11, wherein the charge of composite material is a first charge of composite material, wherein the locating includes locating a plurality of charges of composite material, wherein the positioning includes positioning such that the enclosed volume contains the plurality of charges of composite material, and further wherein the compacting includes simultaneously compacting the plurality of charges of composite material.

B13. The method of any of paragraphs B11-B12, wherein the locating includes placing the charge of composite material on the supporting surface, optionally wherein the placing includes aligning the charge of composite material on the supporting surface, optionally wherein the aligning includes aligning with an alignment jig, and further optionally wherein the placing includes retaining the charge of composite material on the supporting surface with an adhesive.

B14. The method of any of paragraphs B11-B12, wherein the locating includes forming the charge of composite material on the supporting surface, optionally wherein the forming includes laying up a plurality of plies of composite material on the supporting surface to form the charge of composite material, and further optionally wherein the forming includes retaining the charge of composite material on the supporting surface with an adhesive.

B15. The method of any of paragraphs B11-B12, wherein the locating includes placing the charge of composite material on the vacuum compaction device, optionally wherein the placing includes aligning the charge of composite material on a/the barrier structure of the vacuum compaction device, and further optionally wherein the placing includes retaining the charge of composite material on the barrier structure by applying a vacuum to a plurality of retention conduits that are defined by the barrier structure.

B16. The method of any of paragraphs B11-B12, wherein the locating includes forming the charge of composite material on the vacuum compaction device, optionally wherein the forming includes laying up a plurality of plies of composite material on a/the barrier structure of the vacuum compaction device to form the charge of composite material, and further optionally wherein the forming includes retaining the charge of composite material on the barrier structure by applying a vacuum to a plurality of retention conduits that are defined by the barrier structure.

B17. The method of any of paragraphs B1-B16, wherein the vacuum compaction device includes an indexing structure, wherein the supporting surface includes a complementary indexing structure, and further wherein the positioning includes aligning the indexing structure with the complementary indexing structure.

B18. The method of any of paragraphs B1-B17, wherein the method includes compacting the charge of composite material without bagging the charge of composite material.

B19. The method of any of paragraphs B1-B18, wherein the method does not include forming an adhesive bond between the vacuum compaction device and the supporting surface.

B20. The method of any of paragraphs B1-B19, wherein the decreasing is subsequent to the positioning.

B21. The method of any of paragraphs B1-B20, wherein the compacting is concurrent with the decreasing.

B22. The method of any of paragraphs B1-B21, wherein the increasing is subsequent to the decreasing and the compacting.

B23. The method of any of paragraphs B1-B22, wherein the charge of composite material is a first charge of composite material, and further wherein the method includes repeating the method to compact a plurality of charges of composite material on the supporting surface.

B24. The method of paragraph B23, wherein the repeating includes transitioning the vacuum compaction device from the undeformed configuration to the deformed configuration and subsequently returning the vacuum compaction device to the undeformed configuration a plurality of times.

B25. The method of any of paragraphs B23-B24, wherein the repeating includes repeating without damage to the vacuum compaction device.

B26. The method of any of paragraphs B1-B25, wherein the vacuum compaction device includes the vacuum compaction device of any of paragraphs A1-A38.

C1. The use of any of the devices of any of paragraphs A1-A39 or any of the assemblies of any of paragraphs A40-A47 with any of the methods of any of paragraphs B1-B26.

C2. The use of any of the methods of any of paragraphs B1-B26 with any of the devices of any of paragraphs A1-A39 or any of the assemblies of any of paragraphs A40-A47.

C3. The use of any of the devices of any of paragraphs A1-A39, any of the assemblies of any of paragraphs A40-A47, or any of the methods of any of paragraphs B1-B26 to compact a charge of composite material.

C4. The use of any of the devices of any of paragraphs A1-A39, any of the assemblies of any of paragraphs A40-A47, or any of the methods of any of paragraphs B1-B26 to form a portion of a composite structure.

C5. The use of any of the devices of any of paragraphs A1-A39, any of the assemblies of any of paragraphs A40-A47, or any of the methods of any of paragraphs B1-B26 to form a portion of at least one of an airframe, a fuselage of an aircraft, a fuselage barrel of an aircraft, a wing of an aircraft, a stabilizer of an aircraft, a filler, a skin, and a stringer.

C6. The use of a reusable vacuum compaction device to compact a charge of composite material.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A vacuum compaction device for compacting a charge of composite material on a supporting surface, wherein the device is configured to be positioned on the supporting surface to define an enclosed volume, the device comprising:
a barrier structure that includes a first side, which is defined by a first planar wall, and an opposed second side, which is defined by a second planar wall, wherein the first planar wall further includes a first inner side that is opposed to the first side, wherein the second planar wall further includes a second inner side that opposed to the second side, wherein the second inner side is spaced-apart from the first inner side, wherein the barrier structure further includes a plurality of spaced-apart elongate webs that extends between the first inner side of the first planar wall and the second inner side of the second planar wall, wherein the first inner side of the first planar wall, the second inner side of the second planar wall, and the plurality of spaced-apart elongate webs together define a plurality of elongate channels;
a sealing structure that is configured to form a fluid seal between the supporting surface and the barrier structure when compressed therebetween; and
a vacuum distribution manifold that is in fluid communication with, and configured to selectively apply a vacuum to, the enclosed volume, wherein the plurality of elongate channels defines at least a portion of the vacuum distribution manifold.

2. The device of claim 1, wherein the barrier structure further includes a release surface that defines the first side of the barrier structure, wherein the release surface includes at least one of a material that is selected to not adhere to the charge of composite material, a material that is selected to not react with the charge of composite material, and a fluoropolymer.

3. The device of claim 1, wherein the vacuum distribution manifold is a first vacuum distribution manifold that is at least partially defined by a first portion of the plurality of elongate channels, wherein the vacuum is a first vacuum, wherein the device includes a second vacuum distribution manifold that is at least partially defined by a second portion of the plurality of elongate channels and is configured to selectively apply a second vacuum, wherein the first side of the barrier structure defines a plurality of evacuation conduits, which provide fluid communication between the enclosed volume and the first vacuum distribution manifold, and further wherein the first side of the barrier structure defines a plurality of retention conduits, which provide fluid communication between the enclosed volume and the second vacuum distribution manifold.

4. The device of claim 1, wherein the sealing structure is located between the barrier structure and the supporting surface when the vacuum compaction device is positioned on the supporting surface.

5. The device of claim 1, wherein the sealing structure is selected to at least one of not adhere to, not chemically react with, and not transfer a contaminant to the charge of composite material.

6. The device of claim 1, wherein the sealing structure includes at least one of a compression seal, a resilient seal, and a tubular resilient seal.

7. The device of claim 1, wherein the device includes an undeformed configuration when not positioned on the supporting surface and the vacuum is not applied to the enclosed volume and a deformed configuration when positioned on the supporting surface and the vacuum is applied to the enclosed volume.

8. The device of claim 7, wherein the barrier structure is planar when the device is in the undeformed configuration, and further wherein the barrier structure at least partially conforms to a contour of the supporting surface when the device is in the deformed configuration, wherein the contour of the supporting surface includes at least a non-planar contour.

9. The device of claim 7, wherein the sealing structure defines a thickness that is measured in a direction that is perpendicular to the first side of the barrier structure, wherein the thickness includes an undeformed thickness when the device is in the undeformed configuration and a deformed thickness when the device is in the deformed configuration, and further wherein the deformed thickness is less than the undeformed thickness.

10. The device of claim 1, wherein the vacuum compaction device is a reusable vacuum compaction device that is configured to compact a plurality of charges of composite material on the supporting surface without damage to the vacuum compaction device.

11. A composite structure fabrication assembly comprising:
a plurality of charges of composite material;
a supporting surface; and
the vacuum compaction device of claim 1.

12. The assembly of claim 11, wherein the vacuum compaction device is positioned on the supporting surface and defines the enclosed volume, wherein the charge of composite material is located within the enclosed volume, wherein the vacuum is applied to the enclosed volume, and further wherein a contour of the first side of the barrier structure corresponds to a contour of the supporting surface.

13. The assembly of claim 12, wherein at least a portion of the enclosed volume is at least one of bounded by the sealing structure and defined by the sealing structure.

14. The assembly of claim 12, wherein the supporting surface includes at least one of a layup mandrel, a previously compacted charge of composite material, a portion of a composite structure, and a portion of the composite structure that is supported by the layup mandrel.

15. The assembly of claim 12, wherein the supporting surface includes a previously compacted charge of composite material, and further wherein the sealing structure is compressed between the previously compacted charge of composite material and the barrier structure and forms the fluid seal.

16. The assembly of claim 11, wherein the plurality of charges of composite material forms a portion of at least one of a composite structure, an airframe, a fuselage of an aircraft, a fuselage barrel of an aircraft, a wing of an aircraft, a stabilizer of an aircraft, a filler, a skin, and a stringer.

17. The device of claim 1, wherein each of the plurality of elongate channels extends along a longitudinal axis that is at least substantially parallel to the first planar wall and that extends between two opposed edges of the barrier structure, wherein each of the two opposed edges of the barrier structure extends between the first side and the second side, and further wherein the two opposed edges of the barrier structure define at least a portion of an external periphery of the barrier structure.

18. The device of claim 1, wherein the barrier structure is a double-walled panel.

19. The device of claim 3, wherein the device includes the charge of composite material and a vacuum source, wherein the device further includes a vacuum control structure configured to selectively apply the vacuum from the vacuum source, wherein the vacuum control structure is configured such that the second vacuum is applied to the plurality of retention conduits from the vacuum source and via the second vacuum distribution manifold, wherein the vacuum control structure further is configured such that the first vacuum is not applied to the plurality of evacuation conduits via the first vacuum distribution manifold, and further wherein the charge of composite material is retained on the first side of the barrier structure by the second vacuum.

* * * * *